US010497921B2

(12) United States Patent
Kotter et al.

(10) Patent No.: US 10,497,921 B2
(45) Date of Patent: Dec. 3, 2019

(54) CONNECTION BETWEEN TWO BATTERY MODULES OF A BATTERY SYSTEM

(71) Applicant: Bayerische Motoren Werke Aktiengesellschaft, Munich (DE)

(72) Inventors: Philip Kotter, Munich (DE); Anas Mnif, Munich (DE); Tuncay Idikurt, Munich (DE); Thomas Hoefler, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/290,508

(22) Filed: Mar. 1, 2019

(65) Prior Publication Data
US 2019/0198846 A1    Jun. 27, 2019

Related U.S. Application Data

(62) Division of application No. 15/312,161, filed as application No. PCT/EP2015/059481 on Apr. 30, 2015, now abandoned.

(51) Int. Cl.
*H01R 11/00* (2006.01)
*H01M 2/20* (2006.01)
(Continued)

(52) U.S. Cl.
CPC ........... *H01M 2/206* (2013.01); *B60L 3/0046* (2013.01); *B60L 50/64* (2019.02); *B60L 58/21* (2019.02);
(Continued)

(58) Field of Classification Search
CPC ........ H01R 31/06; H01R 11/24; H01R 31/08; H01R 11/282; H01R 11/281; Y02E 60/12
(Continued)

(56) References Cited

U.S. PATENT DOCUMENTS 1,854,489 A    4/1932 Sebell
3,656,091 A    4/1972 Anhalt
(Continued)

FOREIGN PATENT DOCUMENTS

CN          1905244 A       1/2007
DE    10 2009 013 727 A1    9/2010
(Continued)

OTHER PUBLICATIONS

PCT/EP2015/059481, International Search Report (PCT/ISA/220 and PCT/ISA/210) dated Aug. 7, 2015, with partial English translation, enclosing Written Opinion of the International Searching Authority (PCT/ISA/237) (Fourteen (14) pages).
(Continued)

*Primary Examiner* — Thanh Tam T Le
(74) *Attorney, Agent, or Firm* — Crowell & Moring LLP

(57) ABSTRACT

The invention relates to a device for producing an electrically conductive connection between two battery modules of an electrically drivable motor vehicle, comprising at least one clamping unit, which is composed of metal and can be clamped to a connection pole of a battery cell of a battery module or can be clamped to a cell connector that is arranged on the connection pole and that connects the connection pole in an electrically conductive manner to a connection pole of a further battery cell of the battery module.

14 Claims, 9 Drawing Sheets

(51) Int. Cl.
   *H01R 11/28* (2006.01)
   *H01R 13/11* (2006.01)
   *B60L 3/00* (2019.01)
   *B60L 58/21* (2019.01)
   *B60L 50/64* (2019.01)

(52) U.S. Cl.
   CPC ......... *H01R 11/288* (2013.01); *H01R 13/112* (2013.01); *H01M 2220/20* (2013.01); *Y02T 10/7005* (2013.01); *Y02T 10/7061* (2013.01)

(58) Field of Classification Search
   USPC ................ 439/502, 504, 510, 754, 759, 763
   See application file for complete search history.

(56) References Cited

U.S. PATENT DOCUMENTS

| | | |
|---|---|---|
| 4,643,507 A | 2/1987 | Coldren |
| 4,883,430 A | 11/1989 | Siemon |
| 5,462,453 A | 10/1995 | Muller |
| 5,562,489 A | 10/1996 | Cronin |
| 6,428,349 B1 | 8/2002 | Dickson |
| 6,634,891 B1 | 10/2003 | Cheng |
| 7,452,235 B2 | 11/2008 | Davis |
| 8,623,544 B2 * | 1/2014 | Tsuchiya ............... H01M 2/202 429/163 |
| 8,834,183 B2 | 9/2014 | Komoto |
| 8,846,226 B2 * | 9/2014 | Tasai .................. B60H 1/00278 429/72 |
| 2007/0026306 A1 | 2/2007 | Lee et al. |

FOREIGN PATENT DOCUMENTS

| | | |
|---|---|---|
| EP | 0 623 972 A1 | 11/1994 |
| JP | 2011-3433 A | 1/2011 |

OTHER PUBLICATIONS

Chinese Office Action issued in Chinese counterpart application No. 201580011486.1 dated Mar. 5, 2018, with English translation (Seventeen (17) pages).

* cited by examiner

CONNECTION BETWEEN TWO BATTERY MODULES OF A BATTERY SYSTEM

CROSS REFERENCE TO RELATED APPLICATIONS

This application is a divisional application of U.S. application Ser. No. 15/312,161, filed on Nov. 17, 2016, which is a 371 of International Application No. PCT/EP2015/059481, filed Apr. 30, 2015, which claims priority under 35 U.S.C. § 119 from German Patent Application No. 10 2014 209 273.6, filed May 16, 2014, the entire disclosures of which are herein expressly incorporated by reference.

BACKGROUND AND SUMMARY OF THE INVENTION

The invention relates to an apparatus, to a connecting device and to an assembly for producing an electrically conductive connection between two battery modules of a battery system, in particular of an electrically driveable motor vehicle.

In electrically driveable motor vehicles, in particular electric vehicles and hybrid electric vehicles, use is made of battery systems having a multiplicity of electrically interconnected secondary battery cells, in particular for supplying electrical energy to electrical drive devices of the motor vehicles. The secondary battery cells are normally, in order to facilitate installation and uninstallation of a battery system, combined to form battery modules which are electrically interconnected.

For the electrical interconnection of battery modules, use is conventionally made of detachable connections, such as for example screw connections with cable eyelets or plug-type connections, which are arranged at terminal poles of battery cells of battery modules to be connected to one another. Both in the case of screw connections and in the case of plug-type connections, the terminal poles of the battery cells must be specially prepared for the integration of the respective connecting technique into the construction of a battery system, specifically in order to make it possible either for torques of a threaded bolt during a screw connection process to be accommodated or for a plug connector housing or a plug connector blade to be connected to the terminal poles.

It is an object of the invention for a space-saving connecting technique, which is easy to realize, for the production of an electrically conductive connection between two battery modules of a battery system to be provided or to serve as a separating device within a module.

The apparatus according to the invention for producing an electrically conductive connection between two battery modules of a battery system, in particular of an electrically driveable motor vehicle, comprises at least one clamping unit composed of metal, which at least one clamping unit can be fixedly clamped to a terminal pole of a battery cell of a battery module, or which at least one clamping unit can be fixedly clamped to a cell connector which is arranged on the terminal pole and which connects the terminal pole to a terminal pole of a further battery cell of the battery module in electrically conductive fashion.

According to the invention, an electrically conductive connection between two battery modules of a battery system can be realized using at least one clamping unit, whereby at least one conventional screw connection or plug-type connection can be omitted, such that no modification of terminal poles is necessary for the integration of these conventional connecting techniques. This is associated with a considerably simplified realization of the connecting technique according to the invention. Conventional screw connections or plug-type connections require a relatively large structural space, in particular in the case of high current carrying capacities. In comparison with this, the connecting technique according to the invention can be realized in a considerably more space-saving manner. Also, in the case of the connecting technique according to the invention, there is no need for additional assembly space to be planned in, for example for the manipulation of a conventional screw connection. Although more space-saving connecting solutions are known from the prior art, the electrical connections realized here are, owing to their relatively small size, generally greatly limited in terms of their current carrying capacity, or generate a considerable amount of heat during operation owing to their transition resistance, which heat can lead to a deterioration in cell power and to safety-critical states of battery cells and to failure of the electrically conductive connection.

The apparatus according to the invention may also comprise two or more clamping units which can each be fixedly clamped to a terminal pole of a battery cell of a battery module or to a cell connector which is arranged on the terminal pole and which connects the terminal pole to a terminal pole of a further battery cell of the battery module in electrically conductive fashion.

The clamping unit may for example be formed at least partially from copper.

With the use of the connecting technique according to the invention, it is for example possible for an arrangement of a blade on a cell contacting system for the electrically conductive connection of battery modules to be omitted. Instead, it is possible to realize direct electrical contacting with a terminal or with a cell connector. In this way, less structural space is required than in the case of corresponding conventional plug-type connections or screw connections with high current carrying capacities. Furthermore, by way of the clamping unit, a larger transmission surface can be provided than in the case of conventional plug-type connections or screw connections with high current carrying capacities, whereby it is possible, even in a relatively small structural space, for high electrical currents to be transmitted without intense generation of heat. Furthermore, by way of the clamping unit, it is possible for a larger number of contact points to be provided, which in the calculation in accordance with the constriction resistance is one of the two design criteria for a plug-type contact aside from the clamping force, than in the case of conventional plug-type connections or screw connections with high current carrying capacities, whereby it is possible, even in a relatively small structural space, for high electrical currents to be transmitted without intense generation of heat.

In one advantageous refinement, the clamping unit is of U-shaped or C-shaped form, wherein the clamping unit has two clamping limbs and a web which connects the clamping limbs to one another, and wherein, when the clamping unit is fixedly clamped to the terminal pole or to the cell connector, the clamping limbs and/or the web are/is elastically deformed, so as to generate a restoring force, as a result of contact with the terminal pole or with the cell connector. Owing to the elastic deformation of the clamping limbs and/or of the web, or the restoring force generated as a result, a clamping force is generated which is sufficient to be able to fix the clamping unit captively to a terminal pole or to a cell connector. Owing to the U-shaped or C-shaped design of the clamping unit, said clamping unit can be plugged onto a terminal pole or a cell connector such that the clamping unit engages at least partially around the terminal pole or the cell connector.

It is advantageously the case that at least one clamping limb has at least two spring lamellae which are arranged so as to run transversely with respect to the web, spaced apart from one another and parallel to one another. In this way, the clamping limb which is equipped with the spring lamellae can optimally adapt to the respective shaping of a terminal pole or of a cell connector in order to be able to provide as large as possible a contact surface for the transmission of electrical current. A clamping limb may also have more than two, for example 8, 9 or 10, spring lamellae. It is also possible for both clamping limbs to have corresponding spring lamellae.

It is preferably the case that at least one spring lamella has at least two sub-lamellae which are arranged so as to run transversely with respect to the web, spaced apart from one another and parallel to one another. This permits an even more precise adaptation of the contact surface between the clamping unit or the clamping limbs thereof and a terminal pole or a cell connector. A spring lamella may also have three or more sub-lamellae.

It is preferably the case that, on at least one spring lamella, there is formed a bead which runs in a longitudinal direction of the spring lamella. In this way, the normal force or clamping force that can be applied by a spring lamella can be varied, in particular increased, in order to improve a clamped seat of the clamping unit on a terminal pole or on a cell connector. It is also possible for a corresponding bead to be formed on two or more, in particular all, of the spring lamellae.

It is advantageously the case that, on at least two spring lamellae, there is formed in each case at least one bead, wherein the spring lamellae differ from one another in terms of the shaping of their respective beads. By way of this variation of the clamping forces, the clamping forces that can be applied by way of externally situated spring lamellae can be greater than the clamping forces that can be applied by way of internally situated spring lamellae. This permits a fine adjustment of the clamping forces that can be generated by way of the clamping unit.

In a further advantageous refinement, the apparatus comprises at least one coating, which can be arranged electrically between the terminal pole and the clamping unit, for reducing the electrical transition resistance between the terminal pole and the clamping unit, between the terminal pole and the cell connector or between the cell connector and the clamping unit. By way of the coating which reduces a transition resistance, it is possible for a transition resistance to be reduced in order to reduce heat generation at a transition between the terminal pole and the clamping unit, between the terminal pole and the cell connector or between the cell connector and the clamping unit. It is also possible for in each case one corresponding coating to be arranged both between the terminal pole and the cell connector and between the cell connector and the clamping unit.

A further advantageous refinement provides that the apparatus has at least one protective section, which at least one protective section is arranged on that side of the web of the clamping unit which faces toward the terminal pole or toward the cell connector, and which at least one protective section is formed by a section of a cell contacting system, and which at least one protective section is at least partially provided with shock protection ribs at least at an edge facing toward a clamping limb. In this way, it is possible to realize a required shock protection means in a simple manner and using a conventionally provided component of a battery system. Through the use of an existing component of a battery system to realize a shock protection means, it is not necessary to provide additional structural space for the protective section. The protective section serves to permit installation and uninstallation of the clamping unit without electric shocks.

In a further advantageous refinement, the apparatus comprises at least one contacting unit which is connectable in electrically conductive fashion to the web of the clamping unit and by means of which the clamping unit is connectable in electrically conductive fashion to a flexible electrical conductor. The contacting unit can be connected to the web of the clamping unit by way of a welded connection or by way of a crimped connection. The contacting unit may be of flat and thus space-saving form.

In a further advantageous refinement, the apparatus comprises at least one housing which accommodates the clamping unit and which is composed of electrically insulating material and which has two elastically deformable protective limbs which are arranged parallel to one another and to the clamping limbs, wherein, on at least one protective limb, on a side of the protective limb which faces toward the respective other protective limb, there is arranged at least one protective rib which runs parallel to the spring lamellae and which engages from the outside between two mutually adjacently arranged spring lamellae in such a way that, when the clamping unit is not fixedly clamped to the terminal pole or to the cell connector, the spacing between the protective rib and the protective limb situated opposite said protective rib is smaller than the spacing of the spring lamellae to the clamping limb situated opposite said spring lamellae, and in such a way that, when the clamping unit is fixedly clamped to the terminal pole or to the cell connector, the spacing between the protective rib and the protective limb situated opposite said protective rib is equal to the spacing of the spring lamellae to the clamping limb situated opposite said spring lamellae. Since it is the case that, when the clamping unit is not fixedly clamped to the terminal pole or to the cell connector, the spacing between the protective rib, which engages between two mutually adjacently arranged spring lamellae, and the protective limb situated opposite said protective rib is smaller than the spacing of the spring lamellae to the clamping limb situated opposite said spring lamellae, it is the case that, when the clamping unit is not fixedly clamped to the terminal pole or to the cell connector, the protective rib forms a shock protection means in a space-saving manner. When the clamping unit is plugged onto a terminal pole or a cell connector, the protective rib is forced outward, with elastic deformation of the respective protective limb, such that a clamping limb of the clamping unit can come into physical contact with the terminal pole or with the cell connector. It is also possible for two or more corresponding protective ribs to be arranged on a protective limb. It is also possible for both protective limbs to be equipped with corresponding protective ribs. As electrically insulating material, use may be made, in particular, of plastic or a fiber composite plastic. The protective ribs may engage between shock protection ribs of a protective section, formed by a section of a cell contacting system, of the apparatus, in order to further improve the shock protection action.

It is advantageously the case that at least two protective ribs which run parallel to the spring lamellae are arranged spaced apart from one another on the protective limb, wherein those ends of the protective ribs which are averted from the web of the clamping unit are connected to one another by way of a common connecting web. In this way, the protective ribs are connected to one another to form a unit, which is associated with easier manipulation of the protective ribs and easier handling of the apparatus.

A further advantageous embodiment provides that the apparatus has at least one housing which accommodates the clamping unit and which is composed of electrically insulating material and which has two protective limbs arranged parallel to one another and to the clamping limbs and has at least one protective section which runs on that side of the web of the clamping unit which faces toward the cell connector and parallel to the web of the clamping unit, wherein at least one protective projection which runs parallel to the protective limbs is arranged on that side of the protective section which faces toward the cell connector. The protective projection renders the clamping unit substantially inaccessible from the connecting side of the housing, in order to realize a shock protection means in a space-saving manner. The protective section may also have two or more protective projections projecting in the longitudinal direction of the protective projection in the direction of the cell connector. The protective section of the housing may interact with a section of a cell contacting system in order to improve the shock protection action. As electrically insulating material, use may be made in particular of plastic or of a fiber composite material.

The connecting device according to the invention for producing an electrically conductive connection between two battery modules of a battery system, in particular of an electrically driveable motor vehicle, comprises at least one flexible electrical conductor and at least one apparatus according to one of the abovementioned refinements or any desired combination thereof, which at least one apparatus is connected in electrically conductive fashion to the flexible electrical conductor. The advantages and embodiments mentioned above in conjunction with the apparatus are correspondingly associated with the connecting device.

Owing to the flexibility of the electrical conductor, by contrast to the conventional use of rigid connections, tolerance compensation is possible between the battery modules or battery cells thereof that are to be electrically connected to one another. The connecting device may also have two apparatuses which are connected in electrically conductive fashion to one another by way of a flexible electrical conductor.

The assembly according to the invention for producing an electrically conductive connection between two battery modules of a battery system, in particular of an electrically driveable motor vehicle, comprises at least one cell connector by way of which terminal poles of two battery cells of a battery module are connectable to one another in electrically conductive fashion, and at least one apparatus according to one of the abovementioned refinements or any desired combination thereof. The advantages and embodiments mentioned above in conjunction with the apparatus are correspondingly associated with the assembly.

The clamping unit of the apparatus may in this case be connected in electrically conductive fashion by way of the cell connector to a terminal pole of a battery cell. The assembly may also have two or more apparatuses. Furthermore, the assembly may have a connecting device as mentioned above.

In an advantageous refinement, the assembly comprises at least one housing which accommodates the clamping unit and which is composed of electrically insulating material and which has two protective limbs arranged parallel to one another and to the clamping limbs, wherein the protective limbs are connected to one another by way of at least one protective rib which runs transversely with respect to the protective limbs and which runs on that side of the web of the clamping unit which faces toward the cell connector,
 wherein the clamping limbs are of identical form and each have spring lamellae, wherein, on the cell connector, there is formed at least one recess which is open in the direction of the web of the clamping unit and which is aligned with mutually oppositely situated free spaces between in each case two mutually adjacently arranged spring lamellae of the clamping limbs, wherein the protective rib runs through the free spaces and through the recess,
 wherein the protective rib is designed such that it forms, on that side of the housing which faces toward the cell connector, a receptacle which is arranged within a receptacle formed on that side of the clamping unit which faces toward the cell connector.

By way of the protective rib or the receptacle, which is delimited by the protective rib, on that side of the web of the clamping unit which faces toward the cell connector, a shock protection means conforming to IPXXB is formed in a space-saving manner. The protective limbs may also be connected to one another by way of two or more protective ribs, wherein the number must be correspondingly adapted to free spaces between adjacent spring lamellae and to receptacles on the cell connector. The protective ribs may interact with a section of a cell contacting system of a battery system in order to improve the shock protection action. As electrically insulating material, use may be made in particular of plastic or of a fiber composite material.

In a further advantageous refinement, the cell connector has at least one connecting section, which at least one connecting section is of substantially M-shaped form in longitudinal section and which at least one connecting section has two connecting blades which run parallel to the clamping limbs and by way of which the cell connector is connectable to the terminal pole, wherein at least one clamping unit can be fixedly clamped to at least one connecting blade. The connecting blades may be designed to be considerably narrower than a terminal pole of a battery cell. The cell connector may, in order to produce its respective shaping, be punched out of a metal sheet and deformed. The connecting blades may be used both in the case of parallel-connected cells and in the case of series-connected cells.

It is advantageously the case that at least one clamping unit of the apparatus can be fixedly clamped to each connecting blade, wherein the clamping units are accommodated in a common housing of the assembly, wherein each clamping unit is arranged between in each case two protective limbs, which run parallel to the clamping limbs of the clamping units and are arranged spaced apart from one another, of the housing, wherein all protective limbs of the housing are connected to one another by way of a common web of the housing. The clamping units arranged on the connecting blades can be designed to be considerably smaller than a clamping unit arranged directly on a terminal pole. The protective limbs of the housing form a shock protection means, in particular because the protective limbs which enclose a clamping unit between them are arranged relatively close together. The housing is formed from an electrically insulating material, in particular plastic or fiber composite material.

A further advantageous refinement provides that at least one clamping unit and the cell connector are designed such that the clamping unit is connectable to the cell connector by way of a clip-type connection. This provides reliable protection against automatic release of the clamping unit from the cell connector. Furthermore, the housing of the apparatus may be connected to a cell contacting system of a battery system by way of a detent mechanism.

Further details, features and advantages of the invention will emerge from the following description and from the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical components are denoted by the same reference designations.

Figure 1:
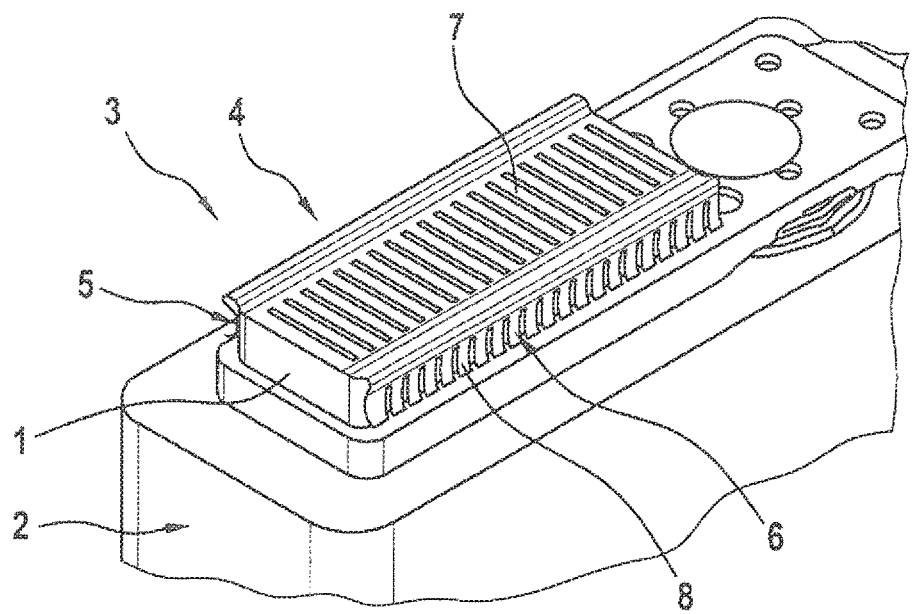
FIG. 1 is a perspective illustration of an exemplary embodiment of an apparatus according to the invention arranged on a terminal pole of a battery cell.

FIG. 1 is a perspective illustration of an exemplary embodiment of an apparatus 3 for producing an electrically conductive connection between two battery modules of a battery system (not illustrated in any more detail) of an electrically driveable motor vehicle according to the invention, said apparatus being arranged on a terminal pole 1, which is formed from aluminum, of a battery cell 2. The apparatus 3 comprises a clamping unit 4 composed of metal, which clamping unit is fixedly clamped to the terminal pole 1 of the battery cell 2 of a battery module.

Figure 2:
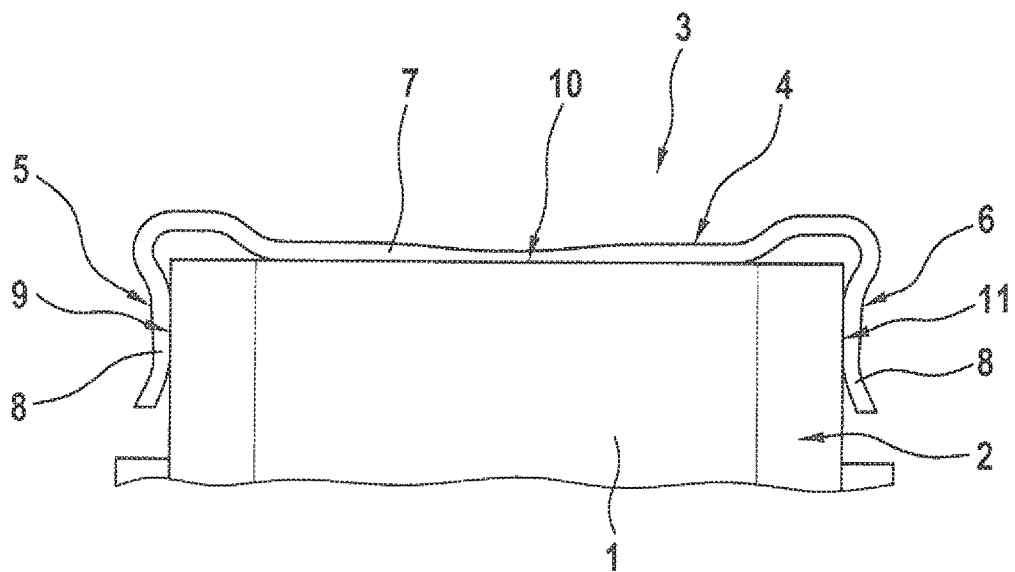
FIG. 2 shows an end view of the apparatus shown in FIG. 1.

The clamping unit 4 is of U-shaped or C-shaped form, as can be seen in particular from FIG. 2. The clamping unit 4 has two clamping limbs 5 and 6 and has a web 7 which connects the clamping limbs 5 and 6 to one another. When the clamping unit 4 is fixedly clamped to the terminal pole 1, the clamping limbs 5 and 6 and/or the web 7 are/is elastically deformed, with a restoring force being generated, owing to physical contact with the terminal pole 1. The clamping limbs 5 and 6 each have a multiplicity of spring lamellae 8 which are arranged so as to run transversely with respect to the web 7, spaced apart from one another and parallel to one another.

Between the terminal pole 1 and the clamping unit 4, there may be arranged at least one coating (not illustrated in any more detail) for reducing the electrical transition resistance between the terminal pole 1 and the clamping unit 4. The coating may be cohesively connected to the terminal pole 1 and/or to the clamping unit 4. It is also possible for both that side of the clamping unit 4 which faces toward the terminal pole 1 and that side of the terminal pole 1 which faces toward the clamping unit 4 to each be at least partially provided with a corresponding coating.

FIG. 2 shows an end view of the apparatus 3 and clamping unit 4 shown in FIG. 1. The clamping unit 4 is connected in electrically conductive fashion, and physically, to the terminal pole 1 in three contacting regions 9, 10 and 11. The coating may be arranged in the contacting region 9, 10 and/or 11.

Figure 3:
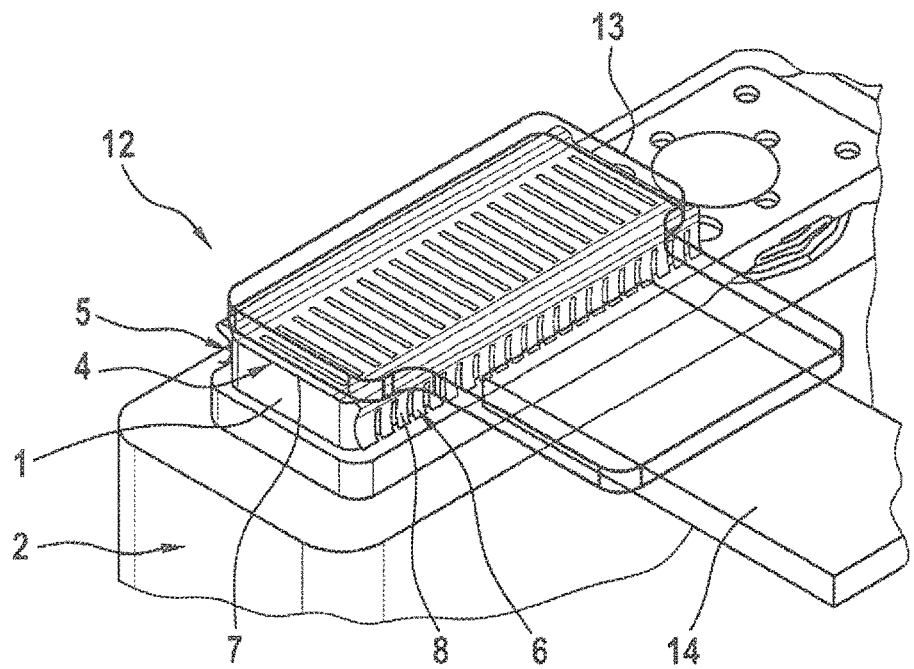
FIG. 3 is a perspective illustration of a further exemplary embodiment of an apparatus according to the invention arranged on a terminal pole of a battery cell.

FIG. 3 is a perspective illustration of a further exemplary embodiment of an apparatus 12 according to the invention for producing an electrically conductive connection between two battery modules of a battery system (not illustrated in any more detail) of an electrically driveable motor vehicle, said apparatus being arranged on a terminal pole 1 of a battery cell 2. The apparatus 12 comprises a clamping unit 4 composed of metal which is fixedly clamped to the terminal pole 1 of the battery cell 2 and which is designed correspondingly to FIGS. 1 and 2. The apparatus 12 furthermore comprises a contacting unit 13 which is illustrated in transparent form, which contacting unit is connected in electrically conductive fashion to the web 7 of the clamping unit 4 and by way of which contacting unit the clamping unit 4 is connected in electrically conductive fashion to a flexible electrical conductor cable 14.

Figure 4:
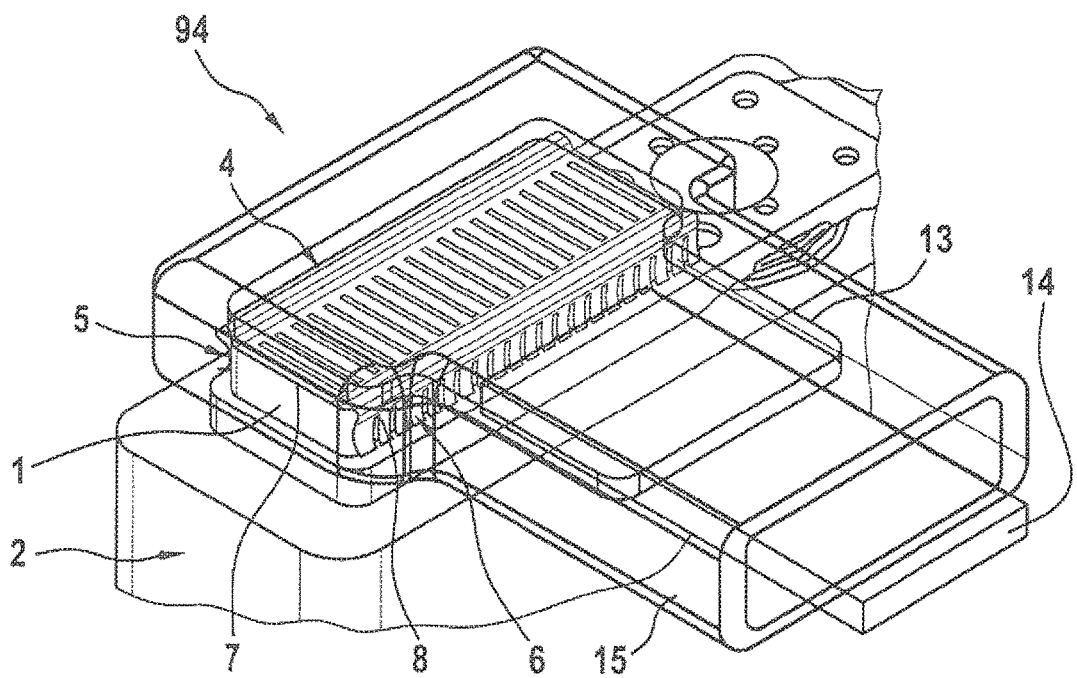
FIG. 4 is a perspective illustration of a further exemplary embodiment of an apparatus according to the invention arranged on a terminal pole of a battery cell.

FIG. 4 is a perspective illustration of a further exemplary embodiment of an apparatus 94 according to the invention for producing an electrically conductive connection between two battery modules of a battery system (not illustrated in any more detail) of an electrically driveable motor vehicle, said apparatus being arranged on a terminal pole 1 of a battery cell 2. The apparatus 94 comprises a clamping unit 4 composed of metal which is fixedly clamped to the terminal pole 1 of the battery cell 2 of a battery module and which is designed correspondingly to FIGS. 1 to 3. The apparatus 94 furthermore comprises a contacting unit 13 which is illustrated in transparent form, which contacting unit is connected in electrically conductive fashion to the web 7 of the clamping unit 4 and by way of which contacting unit the clamping unit 4 is connected in electrically conductive fashion to an electrical conductor cable 14 and which contacting unit is designed correspondingly to FIG. 3. Furthermore, the apparatus 94 comprises a housing 15 which is illustrated in transparent form, which housing surrounds the clamping unit 4 and the contacting unit 13.

Figure 5:
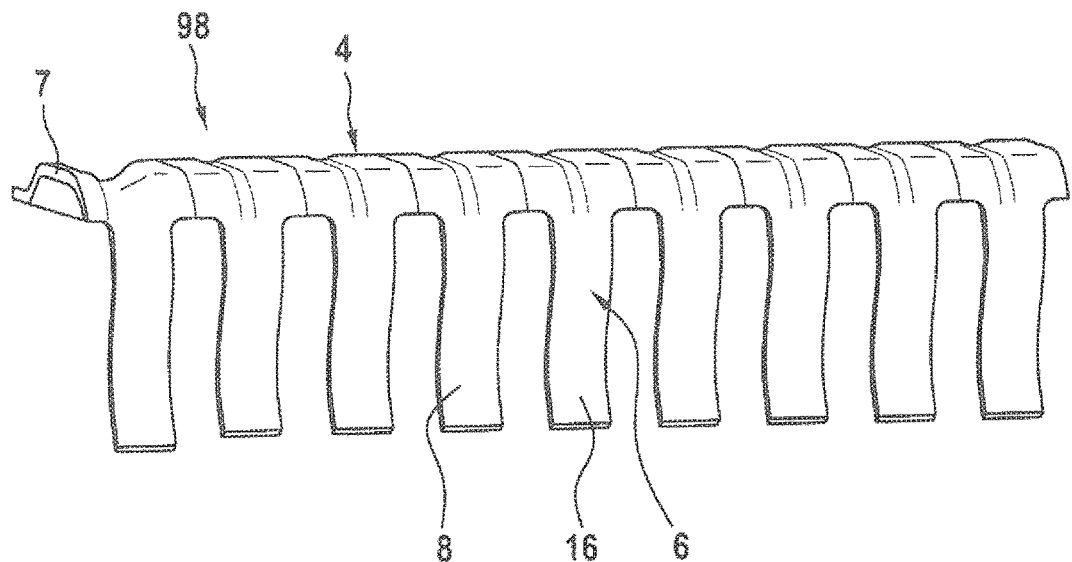
FIG. 5 shows a perspective detail view of a clamping unit of a further exemplary embodiment of an apparatus according to the invention.

FIG. 5 shows a perspective detail view of a clamping unit 4 of a further exemplary embodiment of an apparatus 98 according to the invention. On each spring lamella 8 there is formed a bead 16 which runs in a longitudinal direction of the respective spring lamella 8, wherein the spring lamellae 8 differ from one another in terms of the shaping of their respective beads 16 such that a greater clamping force can be generated by way of the outer spring lamellae 8 shown on the left and on the right than by way of central spring lamellae 8. The beads 16 extend into the region of the web 7 of the clamping unit 4.

Figure 6:
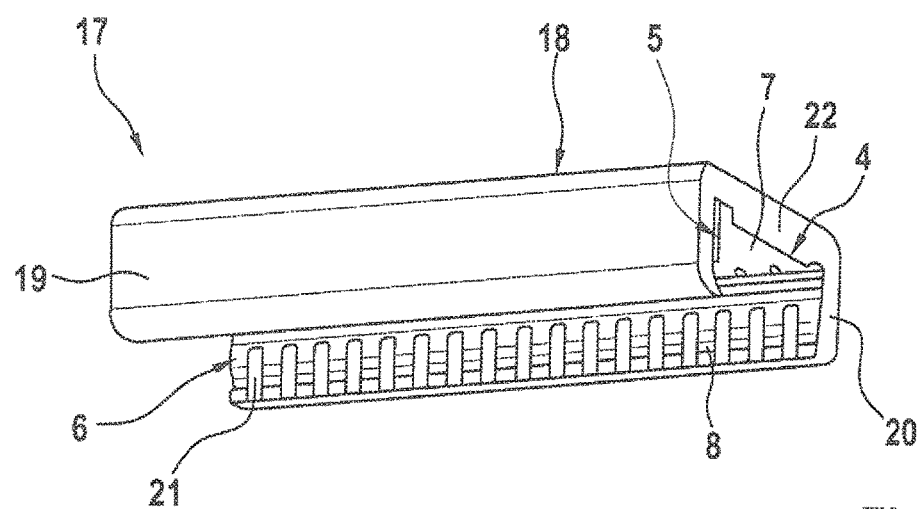
FIG. 6 is a perspective illustration of a further exemplary embodiment of an apparatus according to the invention.

FIG. 6 is a perspective illustration of a further exemplary embodiment of an apparatus 17 according to the invention for producing an electrically conductive connection between two battery modules of a battery system (not illustrated in any more detail) of an electrically driveable motor vehicle. The apparatus 17 comprises a clamping unit 4 composed of metal, which clamping unit can be fixedly clamped to the terminal pole 1, shown in FIGS. 8 and 9, of the battery cell 2 of a battery module, and which clamping unit is designed correspondingly to FIGS. 1 to 4. Furthermore, the apparatus 17 comprises a housing 18 which accommodates the clamping unit 4, which is of U-shaped or C-shaped form and which is composed of electrically insulating material, which housing has two elastically deformable protective limbs 19 and 20, which are arranged parallel to one another and to the clamping limbs 5 and 6, and a web 22, which connects the protective limbs 19 and 20 to one another. On each protective limb 19 and 20, on a side of the protective limb 19 or 20 which faces toward the respective other protective limb 20 or 19, there are arranged multiple protective ribs 21 which run parallel to the spring lamellae 8 and which engage in each case from the outside between two mutually adjacently arranged spring lamellae 8 in such a way that, when the clamping unit 4 is not fixedly clamped to the terminal pole 1, the spacing between the protective ribs 21 and the protective limb 20 or 19 situated opposite said protective ribs is smaller than the spacing of the spring lamellae 8 to the clamping limb 5 or 6 situated opposite said spring lamellae, as shown in particular in FIGS. 7 and 8, and in such a way that, when the clamping unit 4 is fixedly clamped to the terminal pole 1, the spacing between the protective ribs 21 and the protective limb 20 or 19 situated opposite said protective ribs is equal to the spacing of the spring lamellae 8 to the clamping limb 5 or 6 situated opposite said spring lamellae, as shown in FIG. 9.

Figure 7:
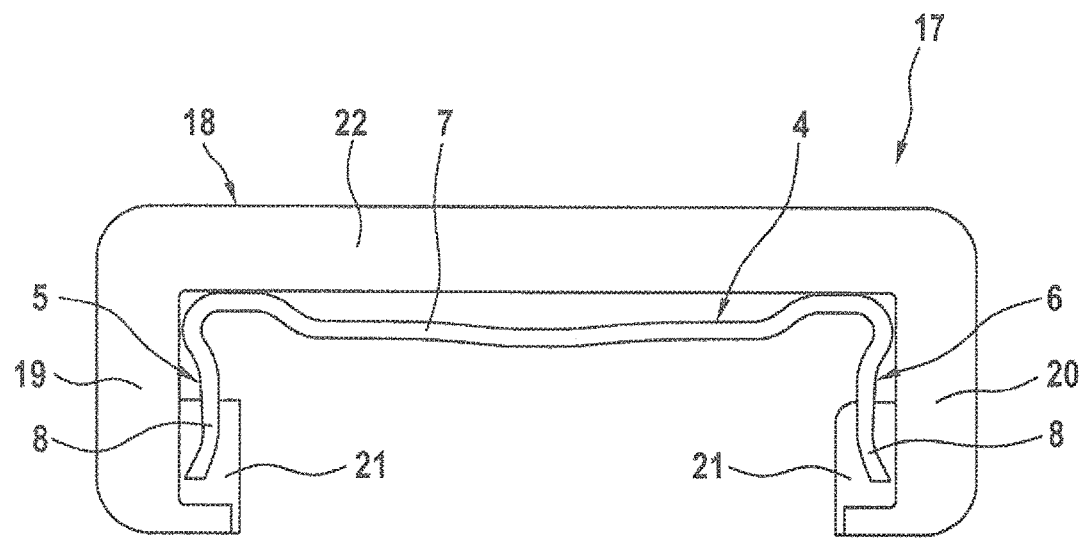
FIG. 7 shows an end view of the apparatus shown in FIG. 6.

FIG. 7 shows an end view of the apparatus 17 shown in FIG. 6. It is possible to see how the protective ribs 21 engage between the spring lamellae 8. It can also be seen that, when the clamping unit 4 is not fixedly clamped to the terminal pole 1, the spacing between the protective ribs 21, which are arranged on a protective limb 19 or 20, and the protective limb 20 or 19 situated opposite said protective ribs is smaller than the spacing of the spring lamellae 8, which are arranged on a clamping limb 5 or 6, to the clamping limb 6 or 5 situated opposite said spring lamellae.

Figure 8:
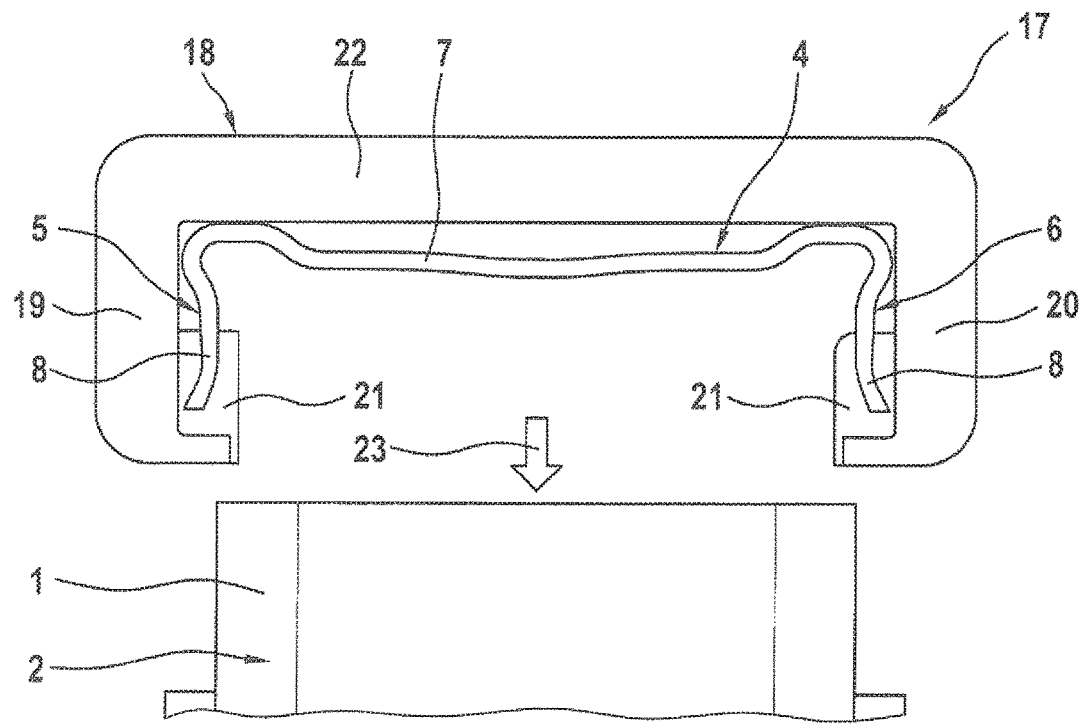
FIG. 8 shows an end view of the apparatus shown in FIG. 6, in a free state.

FIG. 8 shows an end view of the apparatus 17 shown in FIG. 6 in a free state, in which the clamping unit 4 has not been mounted on or fixedly clamped to the terminal pole 1. The apparatus 17 can be moved in the direction of the arrow 23 in order to mount the clamping unit 4 onto the terminal pole 1.

Figure 9:
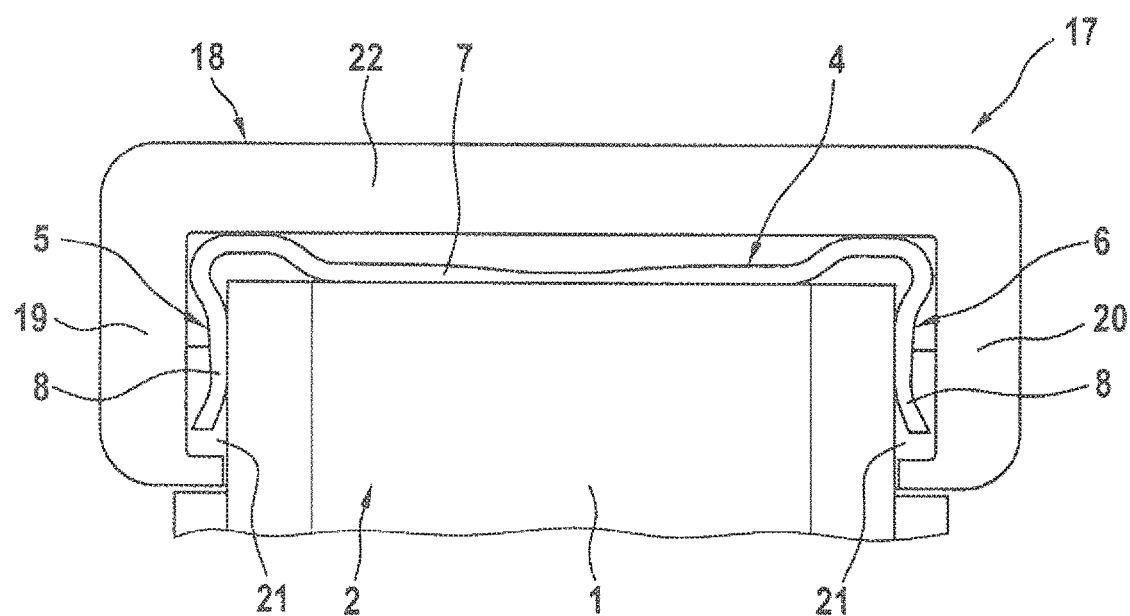
FIG. 9 shows an end view of the apparatus shown in FIG. 6, in a fixedly clamped state.

FIG. 9 shows an end view of the apparatus 17 shown in FIG. 6 in a state in which it has been fixedly clamped to the terminal pole 1. Owing to the physical contact that occurs here between the protective ribs 21 and the terminal pole 1, the protective ribs 21 arranged on the opposite protective limbs 19 and 20 have been forced apart, with the protective limbs 19 and 20 and/or the web 22 being elastically deformed and with a restoring force being generated.

Figure 10:
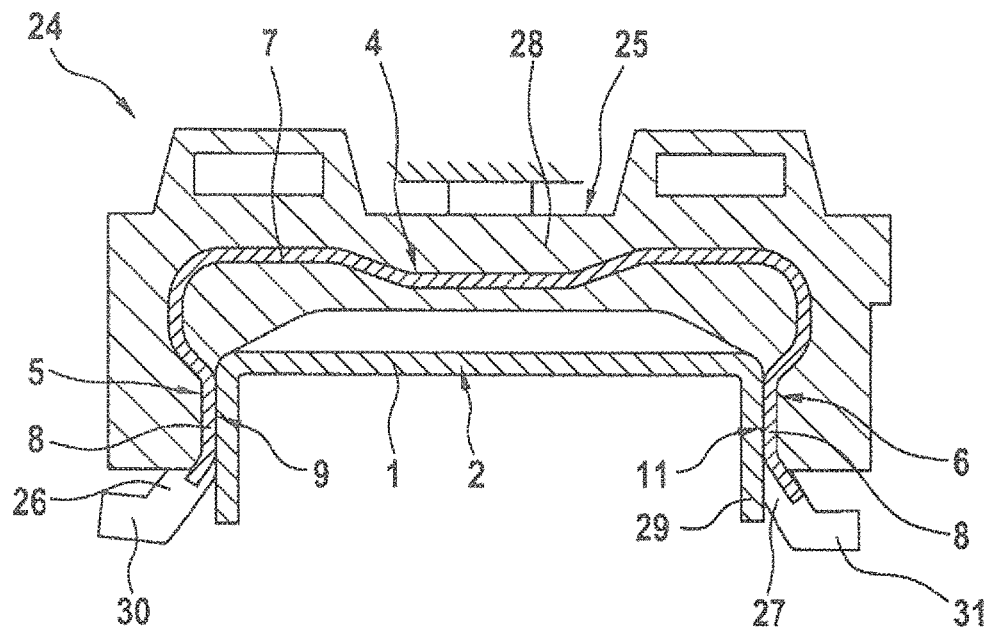
FIG. 10 is a schematic sectional illustration of a further exemplary embodiment of an apparatus according to the invention.

FIG. 10 is a schematic sectional illustration of a further exemplary embodiment of an apparatus 24 according to the invention for producing an electrically conductive connection between two battery modules of a battery system (not illustrated in any more detail) of an electrically driveable motor vehicle. The apparatus 24 comprises a clamping unit 4 composed of metal, which clamping unit is fixedly clamped to the terminal pole 1 of the battery cell 2 of a battery module and is designed correspondingly to FIGS. 1 to 4 and 6 to 9. Furthermore, the apparatus 24 comprises a housing 25, which housing is of U-shaped or C-shaped form, accommodates the clamping unit 4, is composed of electrically insulating material and has two elastically deformable protective limbs 26 and 27, which are arranged parallel to one another and to the clamping limbs 5 and 6, and a web 28 which connects the protective limbs 26 and 27 to one another. On each of the protective limbs 26 and 27, on a side of the protective limb 26 or 27 which faces toward the respective other protective limb 27 or 26, there are arranged multiple protective ribs 29 which run parallel to the spring lamellae 8 and which engage in each case from the outside between two mutually adjacently arranged spring lamellae 8 in such a way that, when the clamping unit 4 is not fixedly clamped to the terminal pole 1, the spacing between the protective ribs 29 and the protective limb 27 or 26 situated opposite said protective ribs is smaller than the spacing of the spring lamellae 8 to the clamping limb 5 or 6 situated opposite said spring lamellae, as shown in FIG. 10 in the case of the protective limb 27 illustrated on the right, and in such a way that, when the clamping unit 4 is fixedly clamped to the terminal pole 1, the spacing between the protective ribs 29 and the protective limb 27 or 26 situated opposite said protective ribs is equal to the spacing of the spring lamellae 8 to the clamping limb 5 or 6 situated opposite said spring lamellae, as shown in FIG. 10 in the case of the protective limb 26 illustrated on the left. Owing to the physical contact of the protective ribs 29 with the terminal pole 1, the protective ribs 29 arranged on the protective limb 26 have been displaced, with the protective limb 26 and/or the web 28 being elastically deformed and with a restoring force being generated. Those ends of the protective ribs 29 which are averted from the web 28 are connected to one another in each case by way of a common connecting web 30 or 31.

Figure 11:
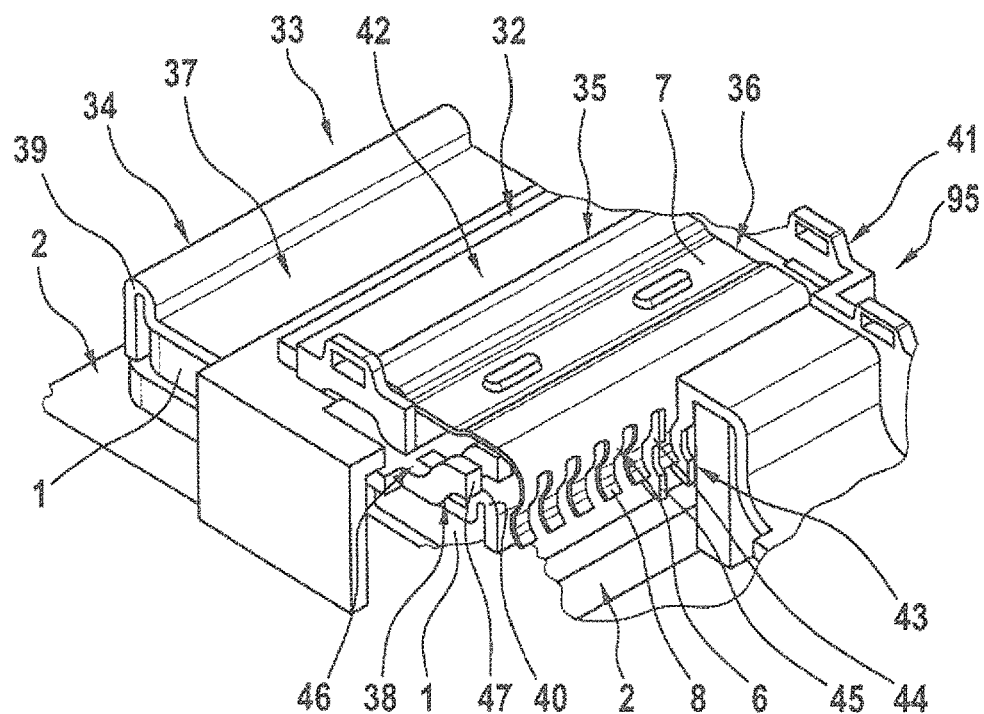
FIG. 11 is a perspective quarter-section illustration of an exemplary embodiment of an assembly according to the invention.

FIG. 11 is a perspective quarter-section illustration of an exemplary embodiment of an assembly 32 according to the invention for producing an electrically conductive connection between two battery modules of a battery system 33 of an electrically driveable motor vehicle. The assembly 32 comprises a cell connector 34, by way of which terminal poles 1 of two battery cells 2 of a battery module are connected to one another in electrically conductive fashion. Furthermore, the assembly 32 comprises an apparatus 35 for producing an electrically conductive connection between two battery modules of the battery system 33.

The apparatus 35 comprises a clamping unit 36 composed of metal, which clamping unit is fixedly clamped to the terminal pole 1 of the battery cell 2 of the battery module and the design of which clamping unit substantially corresponds to the design of the clamping unit 4 shown in FIGS. 1 to 4 and 6 to 10.

The cell connector 34 comprises two connecting sections 37 and 38 which are connected to one another and which are each of substantially M-shaped form in longitudinal section and which have in each case two connecting blades 39 and 40 which run parallel to the clamping limbs 5 and 6, wherein the cell connector 34 is connected by way of the connecting sections 37 and 38 to the terminal poles 1. The clamping unit 36 and the cell connector 34 are designed such that the clamping unit 36 is connected to the cell connector 34 by way of a clip-type connection. For this purpose, the clamping limbs 5 and 6 are, in a region adjoining the web 7, formed so as to be arched outward, with the connecting blades 40 being designed so as to be arched outward complementarily thereto.

Between the terminal pole 1 and the cell connector 34 and/or between the cell connector 34 and the clamping unit 36, there may be arranged at least one coating (not illustrated in any more detail) for reducing the electrical transition resistance between the terminal pole 1 and the cell connector 34 and/or between the cell connector 34 and the clamping unit 36. The coating may be cohesively connected to the terminal pole 1 and/or to the cell connector 34, and/or may be cohesively connected to the cell connector 34 and/or to the clamping unit 36, respectively.

The assembly 32 furthermore comprises a housing 41 which accommodates the clamping unit 36 and which is composed of electrically insulating material and which has two elastically deformable protective limbs 42 and 43 which are arranged parallel to one another and to the clamping limbs 5 and 6. On each protective limb 42 and 43, on a side of the protective limb 42 or 43 which faces toward the respective other protective limb 43 or 42, there are arranged multiple protective ribs 44 which run parallel to the spring lamellae 8 and which engage in each case from the outside between two mutually adjacently arranged spring lamellae 8 in such a way that, when the clamping unit 36 is not fixedly clamped to the terminal pole 1, the spacing between the protective ribs 44 and the protective limb 43 or 42 situated opposite said protective ribs is smaller than the spacing of the spring lamellae 8 to the clamping limb 5 or 6 situated opposite said spring lamellae, and in such a way that, when the clamping unit 36 is fixedly clamped to the terminal pole 1, the spacing between the protective ribs 44 and the protective limb 43 or 42 situated opposite said protective ribs is equal to the spacing of the spring lamellae 8 to the clamping limb 5 or 6 situated opposite said spring lamellae. The lower ends of the protective ribs 44 are connected to one another by way of a common connecting web 45.

The apparatus 35 furthermore comprises a protective section 46, which protective section is arranged on that side of the web 7 of the clamping unit 36 which faces toward the terminal pole 1 or the cell connector 34, which protective section is formed by a section of a cell contacting system 95, and which protective section is equipped, on each edge facing toward a protective limb 42 or 43, with shock protection ribs 47. The protective ribs 44 engage between the shock protection ribs 47.

Figure 12:
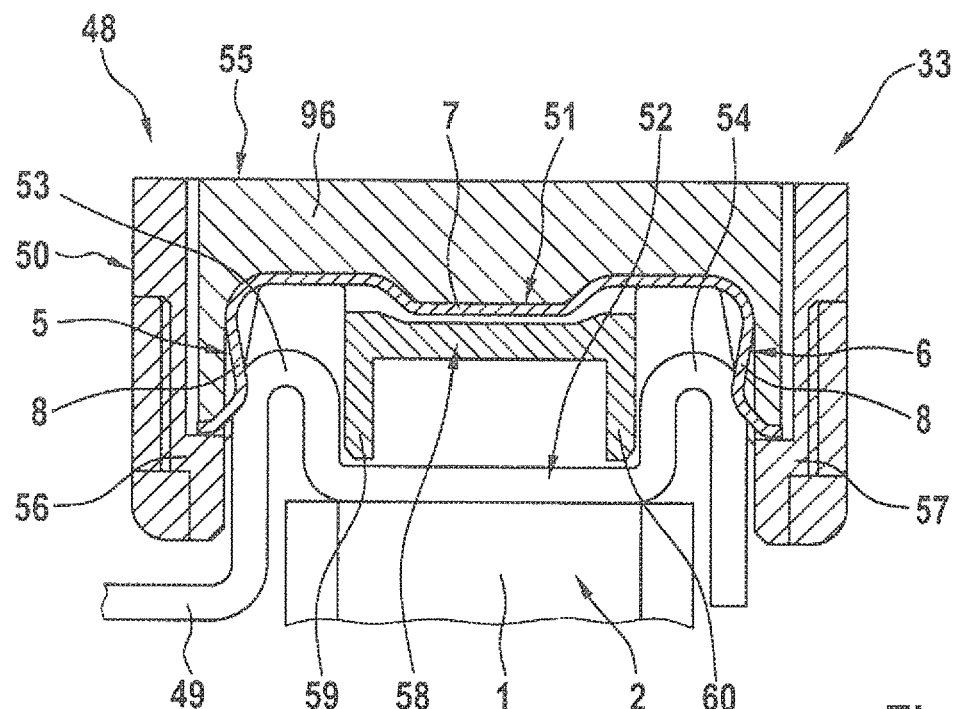
FIG. 12 is a sectional illustration of a further exemplary embodiment of an assembly according to the invention.

FIG. 12 shows a sectional illustration of a further exemplary embodiment of an assembly 48 according to the invention for producing an electrically conductive connection between two battery modules of a battery system 33 of an electrically driveable motor vehicle. The assembly 48 comprises a cell connector 49, by way of which terminal poles 1 of two battery cells 2 of a battery module are connected to one another in electrically conductive fashion. Furthermore, the assembly 48 comprises an apparatus 50 for producing an electrically conductive connection between two battery modules of the battery system 33.

The apparatus 50 comprises a clamping unit 51 composed of metal, which clamping unit is fixedly clamped to the cell connector 49 and the design of which clamping unit substantially corresponds to the design of the clamping unit 4 or 36 shown in FIGS. 1 to 4 and 6 to 11.

The cell connector 49 comprises a connecting section 52 which is of substantially M-shaped form in longitudinal section and which has two connecting blades 53 and 54 which run parallel to the clamping limbs 5 and 6, wherein the cell connector 49 is connected by way of the connecting section 52 to the terminal pole 1.

Between the terminal pole 1 and the cell connector 49 and/or between the cell connector 49 and the clamping unit 51, there may be arranged at least one coating (not illustrated in any more detail) for reducing the electrical transition resistance between the terminal pole 1 and the cell connector 49 and/or between the cell connector 49 and the clamping unit 51. The coating may be cohesively connected to the terminal pole 1 and/or to the cell connector 49, and/or may be cohesively connected to the cell connector 49 and/or to the clamping unit 51, respectively.

The apparatus 50 furthermore comprises a housing 55 which accommodates the clamping unit 51 and which is composed of electrically insulating material and which has two protective limbs 56 and 57, the latter being arranged parallel to one another and to the clamping limbs 5 and 6, and which has a protective section 58, the latter running on that side of the web 7 of the clamping unit 51 which faces toward the cell connector 49 and parallel to the web 7 of the clamping unit 51. On that side of the protective section 58 which faces toward the cell connector 49, there are arranged two protective projections 59 and 60 which run parallel to the protective limbs 56 and 57 and which extend as far as the connecting section 52 and which render the clamping unit 51 substantially inaccessible. The protective limbs 56 and 57 are connected to one another by way of a web 96.

Figure 13:
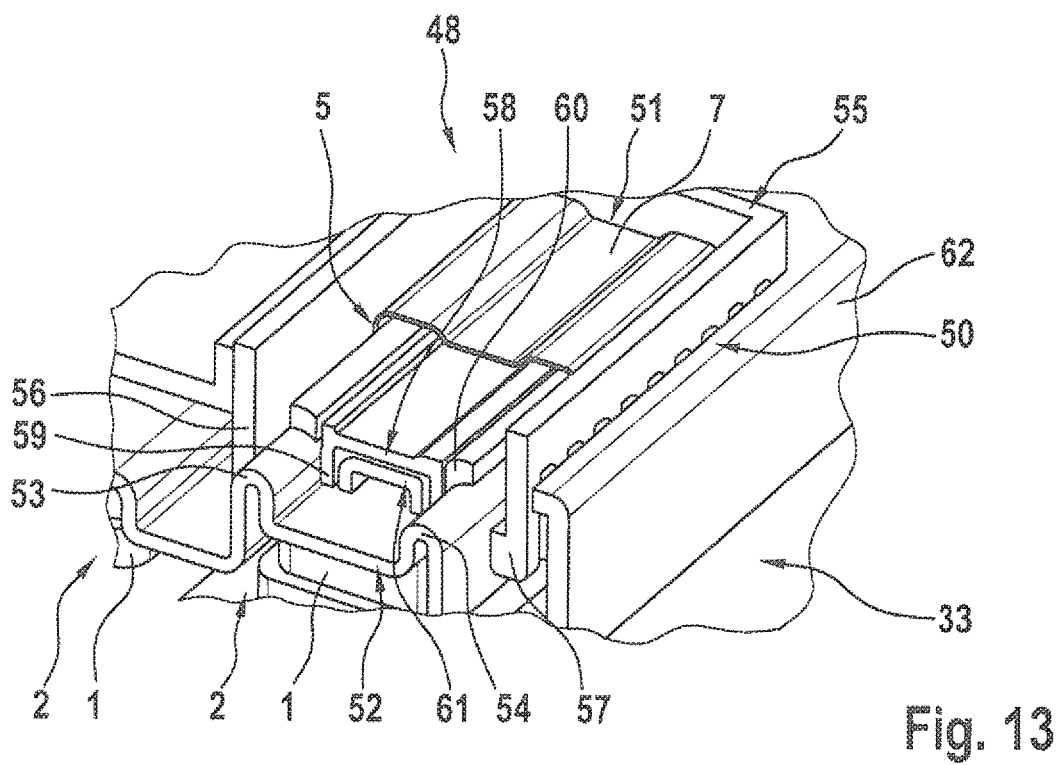
FIG. 13 is a perspective, partially sectional illustration of the assembly shown in FIG. 12.

FIG. 13 is a perspective, partially sectional illustration of the assembly 48 shown in FIG. 12. The housing 55 of the apparatus 50 interacts with a protective section 61 of a cell contacting system 62 of the battery system 33 in order to improve the shock protection action.

Figure 14:
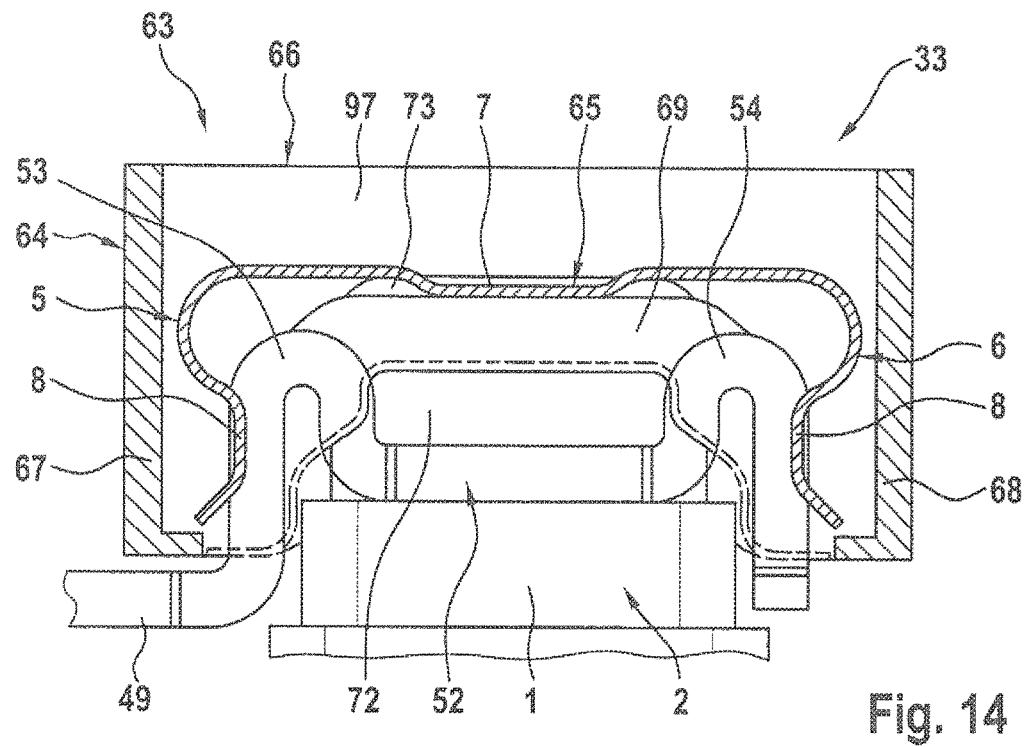
FIG. 14 is a sectional illustration of a further exemplary embodiment of an assembly according to the invention.

FIG. 14 is a sectional illustration of a further exemplary embodiment of an assembly 63 according to the invention for producing an electrically conductive connection between two battery modules of a battery system 33 of an electrically driveable motor vehicle. The assembly 63 comprises a cell connector 49 by way of which terminal poles 1 of two battery cells 2 of a battery module are connected to one another in electrically conductive fashion. Furthermore, the assembly 63 comprises an apparatus 64 for producing an electrically conductive connection between two battery modules of the battery system 33.

The apparatus 64 comprises a clamping unit 65 composed of metal, which clamping unit is fixedly clamped to the cell connector 49 and the design of which clamping unit substantially corresponds to the design of the clamping unit 4, 36 or 51 shown in FIGS. 1 to 4 and 6 to 13. Each spring lamella 8 of a clamping limb 5 or 6 has three sub-lamellae 74 which are arranged so as to run transversely with respect to the web 7, spaced apart from one another and parallel to one another.

The cell connector 49 comprises a connecting section 52 which is of substantially M-shaped form in longitudinal section and which has two connecting blades 53 and 54 which run parallel to the clamping limbs 5 and 6, wherein the cell connector 49 is connected to the terminal pole 1 by way of the connecting section 52.

Between the terminal pole 1 and the cell connector 49 and/or between the cell connector 49 and the clamping unit 65, there may be arranged at least one coating (not illustrated in any more detail) for reducing the electrical transition resistance between the terminal pole 1 and the cell connector 49, and/or between the cell connector 49 and the clamping unit 65, respectively. The coating may be cohesively connected to the terminal pole 1 and/or to the cell connector 49, and/or may be cohesively connected to the cell connector 49 and/or to the clamping unit 65, respectively.

Figure 15:
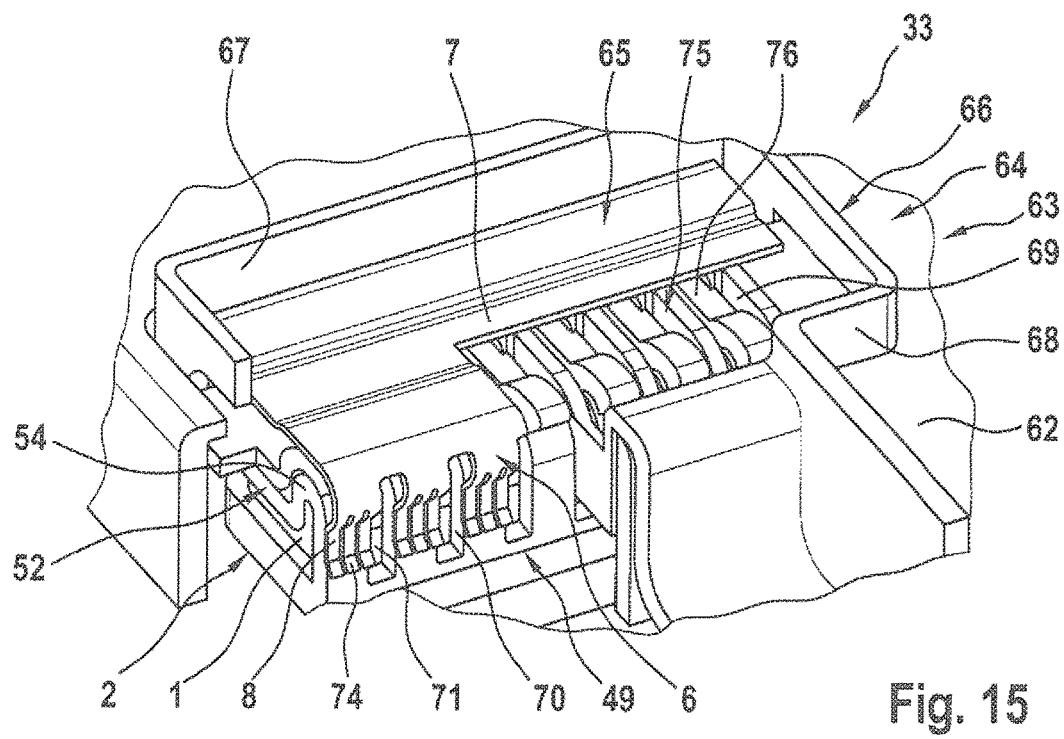
FIG. 15 is a perspective quarter-section illustration of the assembly shown in FIG. 14.

The apparatus 64 furthermore comprises a housing 66 which accommodates the clamping unit 65 and which is composed of electrically insulating material, which housing has two protective limbs 67 and 68, which are arranged parallel to one another and to the clamping limbs 5 and 6, and a web 97 which connects the protective limbs 67 and 68 to one another. The protective limbs 67 and 68 are connected to one another by way of multiple protective ribs 69 which run transversely with respect to the protective limbs 67 and 68, which protective ribs run on that side of the web 7 of the clamping unit 65 which faces toward the cell connector 49. The clamping limbs 5 and 6 are of identical form and each have multiple spring lamellae 6. On the cell connector 49 there are formed recesses 70 which are open in the direction of the web 7 of the clamping unit 65 and which are in each case aligned with mutually oppositely situated free spaces 71 between in each case two mutually adjacently arranged spring lamellae 8 of the clamping limbs 5 and 6, wherein each protective rib 69 runs through two free spaces 71 and through one recess 70, as shown in FIG. 15. The protective ribs 69 are designed such that they form, on that side of the housing 66 which faces toward the cell connector 49, a receptacle 72 which is arranged within a receptacle 73 formed on that side of the clamping unit 65 which faces toward the cell connector 49.

FIG. 15 is a perspective, quarter-section illustration of the assembly 63 shown in FIG. 14. The apparatus 64 interacts with a protective section 75 of a cell contacting system 62 of the battery system 33 in order to improve the shock protection action, wherein the protective section 75 has multiple ribs 76 which run parallel to the protective ribs 69.

Figure 16:
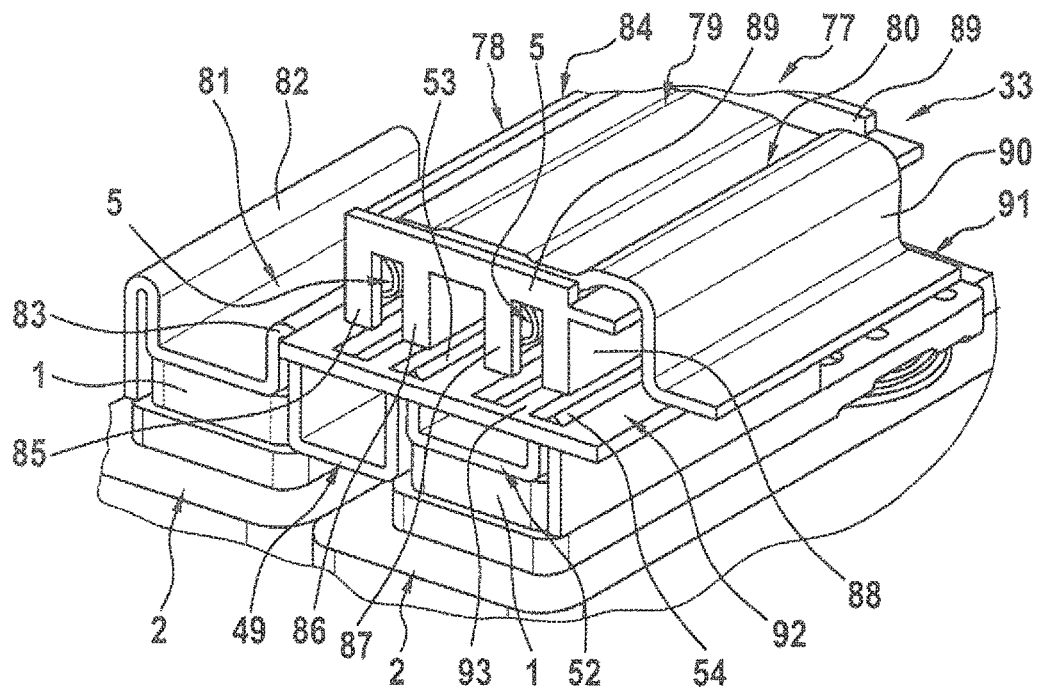
FIG. 16 is a perspective illustration of a further exemplary embodiment of an assembly according to the invention.

FIG. 16 is a perspective illustration of a further exemplary embodiment of an assembly 77 according to the invention for producing an electrically conductive connection between two battery modules of a battery system 33 of an electrically driveable motor vehicle. The assembly 77 comprises a cell connector 49 by way of which terminal poles 1 of two battery cells 2 of a battery module are connected to one another in electrically conductive fashion. The assembly 77 furthermore comprises an apparatus 78 for producing an electrically conductive connection between two battery modules of the battery system 33.

The apparatus 78 comprises two clamping units 79 and 80 composed of metal, which clamping units can be fixedly clamped to the cell connector 49 and are of identical form, and the respective design of which clamping units substantially corresponds to the design of the clamping unit 4, 36, 51 or 65 shown in FIGS. 1 to 4 and 6 to 15, wherein the clamping units 79 and 80 each have a considerably narrower web 7 than the clamping units 4, 36, 51 and 65 described above.

The cell connector 49 comprises two connecting sections 52 and 81 which are of substantially M-shaped form in longitudinal section and which have in each case two connecting blades 53 and 54, and 82 and 83, respectively, which connecting blades run parallel to the clamping limbs 5 and 6, wherein the cell connector 49 is connected by way of the connecting sections 52 and 81 to the terminal poles 1. In each case one clamping unit 79 and 80 respectively can be fixedly clamped to the connecting blades 53 and 54.

Between a terminal pole 1 and the cell connector 49 and/or between the cell connector 49 and at least one clamping unit 79 or 80, there may be arranged at least one coating (not illustrated in any more detail) for reducing the electrical transition resistance between the terminal pole 1 and the cell connector 49, and/or between the cell connector 49 and the clamping unit 79 or 80, respectively. The coating may be cohesively connected to the terminal pole 1 and/or to the cell connector 49, and/or may be cohesively connected to the cell connector 49 and/or to the clamping unit 79 or 80, respectively.

A clamping unit 79 or 80 of the apparatus 78 can be fixedly clamped to each connecting blade 53 or 54 respectively. The clamping units 79 and 80 are accommodated in a common housing 84 of the assembly 77. Each clamping unit 79 or 80 is arranged between in each case two protective limbs 85 and 86, or 87 and 88, respectively, of the housing 84, which protective limbs are arranged so as to run parallel to the clamping limbs 5 and 6 of the clamping units 79 and 80 and spaced apart from one another, wherein all of the protective limbs 85, 86, 87 and 88 of the housing 84 are connected to one another by way of two common webs 89 of the housing 84. At that side of the webs 7 of the clamping units 79 and 80 which is averted from the cell connector 49, the clamping units 79 and 80 are connected to a contacting unit 90, by way of which the clamping units 79 and 80 can be connected in electrically conductive fashion to a flexible electrical conductor (not shown). The apparatus 78 comprises a protective section 92 which is formed by a section of a cell contacting system 91 and which can interact with the housing 84 in order to improve the shock protection action. For this purpose, the protective section 92 comprises longitudinal ribs 93 which run parallel to the protective limbs 85, 86, 87 and 88.

Figure 17:
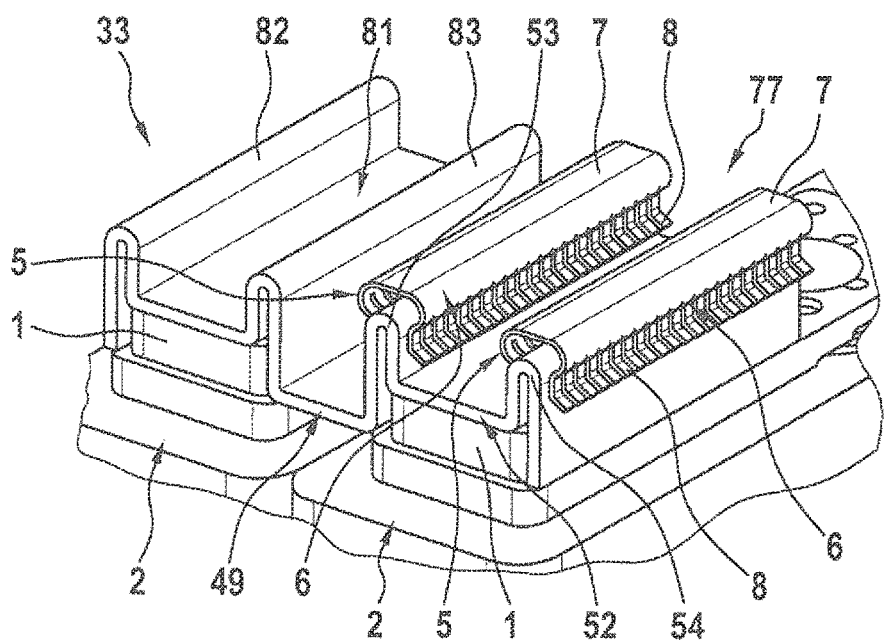
FIG. 17 is a perspective detail illustration of the assembly shown in FIG. 16.

FIG. 17 is a perspective detail illustration of the assembly 77 shown in FIG. 16. For the sake of clarity, only the clamping units 79 and 80 and the cell connector 49 are illustrated, wherein the clamping units 79 and 80 are fixedly clamped to the connecting blades 53 and 54.

LIST OF REFERENCE DESIGNATIONS

1 Terminal pole
2 Battery cell
3 Apparatus
4 Clamping unit
5 Clamping limb
6 Clamping limb
7 Web
8 Spring lamella
9 Contacting region
10 Contacting region
11 Contacting region
12 Apparatus
13 Contacting unit
14 Electrical conductor
15 Housing
16 Bead
17 Apparatus
18 Housing
19 Protective limb
20 Protective limb
21 Protective rib
22 Web
23 Arrow 24 Apparatus
25 Housing
26 Protective limb
27 Protective limb
28 Web
29 Protective rib
30 Connecting web
31 Connecting web
32 Assembly
33 Battery system
34 Cell connector
35 Apparatus
36 Clamping unit
37 Connecting section
38 Connecting section
39 Connecting blade
40 Connecting blade
41 Housing
42 Protective limb
43 Protective limb
44 Protective rib
45 Connecting web
46 Protective section
47 Shock protection rib
48 Assembly
49 Cell connector
50 Apparatus
51 Clamping unit
52 Connecting section
53 Connecting blade
54 Connecting blade
55 Housing
56 Protective limb
57 Protective limb
58 Protective section
59 Protective projection
60 Protective projection
61 Protective section
62 Cell contacting system
63 Assembly
64 Apparatus
65 Clamping unit
66 Housing
67 Protective limb
68 Protective limb
69 Protective rib
70 Recess
71 Free space
72 Receptacle
73 Receptacle
74 Sub-lamella
75 Protective section
76 Rib
77 Assembly
78 Apparatus
79 Clamping unit
80 Clamping unit
81 Connecting section
82 Connecting blade
83 Connecting blade
84 Housing
85 Protective limb
86 Protective limb
87 Protective limb
88 Protective limb
89 Web
90 Contacting unit
91 Cell contacting system
92 Protective section
93 Longitudinal rib
94 Apparatus
95 Cell contacting system
96 Web
97 Web
98 Apparatus The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus configured to produce an electrically conductive connection between two battery modules of an electrically driveable motor vehicle, wherein the apparatus comprising:
    a clamping unit composed of metal,
        wherein the clamping unit is configured to be fixedly clamped to a terminal pole of a battery cell of a battery module or to a cell connector arranged on the terminal pole that connects the terminal pole to a terminal pole of a further battery cell of the battery module in an electrically conductive fashion,
        wherein the clamping unit comprises one of a U-shaped and a C-shaped form, wherein the clamping unit has two clamping limbs and a web that connects the two clamping limbs to one another, and wherein, when the clamping unit is fixedly clamped to the terminal pole or to the cell connector, respectively, at least one of the clamping limbs and the web is elastically deformed such that a restoring force is generated as a result of contact with the terminal pole or with the cell connector, respectively, and
        wherein at least one of the two clamping limbs has at least two spring lamellae arranged to run transversely with respect to the web, spaced apart from one another and parallel to one another; and
    a housing that accommodates the clamping unit and is composed of an electrically insulating material and has two elastically deformable protective limbs which are arranged parallel to one another and to the clamping limbs,
        wherein, on at least one protective limb, on a side of the protective limb which faces toward the respective other protective limb, there is arranged at least one protective rib which runs parallel to the spring lamellae and which engages from the outside between two mutually adjacently arranged spring lamellae such that, when the clamping unit is not fixedly clamped to the terminal pole or to the cell connector, respectively, the spacing between the protective rib and the protective limb situated opposite said protective rib is smaller than the spacing of the spring lamellae to the clamping limb situated opposite said spring lamellae.

2. The apparatus as claimed in claim 1, wherein, on at least one spring lamella, there is formed a bead that runs in a longitudinal direction of the spring lamella.

3. The apparatus as claimed in claim 1, wherein, on at least two spring lamellae, there is formed in each case at least one bead, wherein the spring lamellae differ from one another in terms of a shaping of their respective beads.

4. The apparatus as claimed in claim 1, wherein at least one coating, arranged electrically between the terminal pole and the clamping unit, is configured to reduce the electrical transition resistance between one of the terminal pole and the clamping unit, between the terminal pole and the cell connector, and between the cell connector and the clamping unit.

5. The apparatus as claimed in claim 1, wherein at least one protective section is arranged on a side of the web of the clamping unit that faces toward the terminal pole or toward the cell connector, respectively,
- wherein the at least one protective section is formed by a section of a cell contacting system, and
- wherein the at least one protective section is at least partially provided with shock protection ribs at least at an edge facing toward a clamping limb.

6. The apparatus as claimed in claim 1, wherein at least one contacting unit is connectable in an electrically conductive fashion to the web of the clamping unit, and by which the clamping unit is connectable in an electrically conductive fashion to a flexible electrical conductor.

7. The apparatus as claimed in claim 1, wherein, when the clamping unit is fixedly clamped to the terminal pole or to the cell connector, respectively, the spacing between the protective rib and the protective limb situated opposite said protective rib is equal to the spacing of the spring lamellae to the clamping limb situated opposite said spring lamellae.

8. The apparatus as claimed in claim 7, wherein at least two protective ribs which run parallel to the spring lamellae are arranged spaced apart from one another on the protective limb, wherein ends of the protective ribs which are averted from the web of the clamping unit are connected to one another by at least one common connecting web.

9. A connecting device for producing an electrically conductive connection between two battery modules of an electrically driveable motor vehicle, wherein the connecting device has at least one flexible electrical conductor and at least one apparatus, which is connected in electrically conductive fashion to the flexible electrical conductor, wherein the apparatus comprises:
- a clamping unit composed of metal,
  - wherein the clamping unit is configured to be fixedly clamped to a terminal pole of a battery cell of a battery module or to a cell connector arranged on the terminal pole that connects the terminal pole to a terminal pole of a further battery cell of the battery module in an electrically conductive fashion,
  - wherein the clamping unit comprises one of a U-shaped and a C-shaped form, wherein the clamping unit has two clamping limbs and a web that connects the two clamping limbs to one another, and wherein, when the clamping unit is fixedly clamped to the terminal pole or to the cell connector, respectively, at least one of the clamping limbs and the web is elastically deformed such that a restoring force is generated as a result of contact with the terminal pole or with the cell connector, respectively, and
  - wherein at least one of the two clamping limbs has at least two spring lamellae arranged to run transversely with respect to the web, spaced apart from one another and parallel to one another; and
- a housing that accommodates the clamping unit and is composed of an electrically insulating material and has two elastically deformable protective limbs which are arranged parallel to one another and to the clamping limbs,
  - wherein, on at least one protective limb, on a side of the protective limb which faces toward the respective other protective limb, there is arranged at least one protective rib which runs parallel to the spring lamellae and which engages from the outside between two mutually adjacently arranged spring lamellae such that, when the clamping unit is not fixedly clamped to the terminal pole or to the cell connector, respectively, the spacing between the protective rib and the protective limb situated opposite said protective rib is smaller than the spacing of the spring lamellae to the clamping limb situated opposite said spring lamellae.

10. An assembly for producing an electrically conductive connection between two battery modules of an electrically driveable motor vehicle, having at least one cell connector by way of which terminal poles of two battery cells of a battery module are connectable to one another in an electrically conductive fashion by way of an apparatus, wherein the apparatus comprises:
- a clamping unit composed of metal,
  - wherein the clamping unit is configured to be fixedly clamped to a terminal pole of a battery cell of a battery module or to a cell connector arranged on the terminal pole that connects the terminal pole to a terminal pole of a further battery cell of the battery module in an electrically conductive fashion,
  - wherein the clamping unit comprises one of a U-shaped and a C-shaped form, wherein the clamping unit has two clamping limbs and a web that connects the two clamping limbs to one another, and wherein, when the clamping unit is fixedly clamped to the terminal pole or to the cell connector, respectively, at least one of the clamping limbs and the web is elastically deformed such that a restoring force is generated as a result of contact with the terminal pole or with the cell connector, respectively, and
  - wherein at least one of the two clamping limbs has at least two spring lamellae arranged to run transversely with respect to the web, spaced apart from one another and parallel to one another; and
- a housing that accommodates the clamping unit and is composed of an electrically insulating material and has two elastically deformable protective limbs which are arranged parallel to one another and to the clamping limbs,
  - wherein, on at least one protective limb, on a side of the protective limb which faces toward the respective other protective limb, there is arranged at least one protective rib which runs parallel to the spring lamellae and which engages from the outside between two mutually adjacently arranged spring lamellae such that, when the clamping unit is not fixedly clamped to the terminal pole or to the cell connector, respectively, the spacing between the protective rib and the protective limb situated opposite said protective rib is smaller than the spacing of the spring lamellae to the clamping limb situated opposite said spring lamellae.

11. The assembly as claimed in claim 10, wherein the clamping limbs are of identical form and each have spring lamellae, wherein, on the cell connector, there is formed at least one recess which is open in the direction of the web of the clamping unit and which is aligned with mutually oppositely situated free spaces between in each case two mutually adjacently arranged spring lamellae of the clamping limbs, wherein the protective rib runs through the free spaces and through the recess, and wherein the protective rib is configured such that it forms, on that side of the housing which faces toward the cell connector, a receptacle which is arranged within a receptacle formed on that side of the clamping unit which faces toward the cell connector.

12. The assembly as claimed in claim 10, wherein the cell connector has at least one connecting section, which at least one connecting section is of substantially M-shaped form in longitudinal section and which at least one connecting section has two connecting blades which run parallel to the clamping limbs and by way of which the cell connector is connectable to the terminal pole, wherein at least one clamping unit can be fixedly clamped to at least one connecting blade.

13. The assembly as claimed in claim 12, wherein at least one clamping unit can be fixedly clamped to each connecting blade, wherein the clamping units are accommodated in the housing of the assembly, wherein each clamping unit is arranged between, in each case, two protective limbs, which run parallel to the clamping limbs of the clamping units and are arranged spaced apart from one another, of the housing, wherein all protective limbs of the housing are connected to one another by way of a common connecting web of the housing.

14. The assembly as claimed in claim 10, wherein at least one clamping unit and the cell connector are configured such that the clamping unit is connectable to the cell connector by way of a clip-type connection.

\* \* \* \* \*